March 28, 1939.  W. M. GETTYS  2,152,038
BELT DRIVE
Filed March 7, 1938
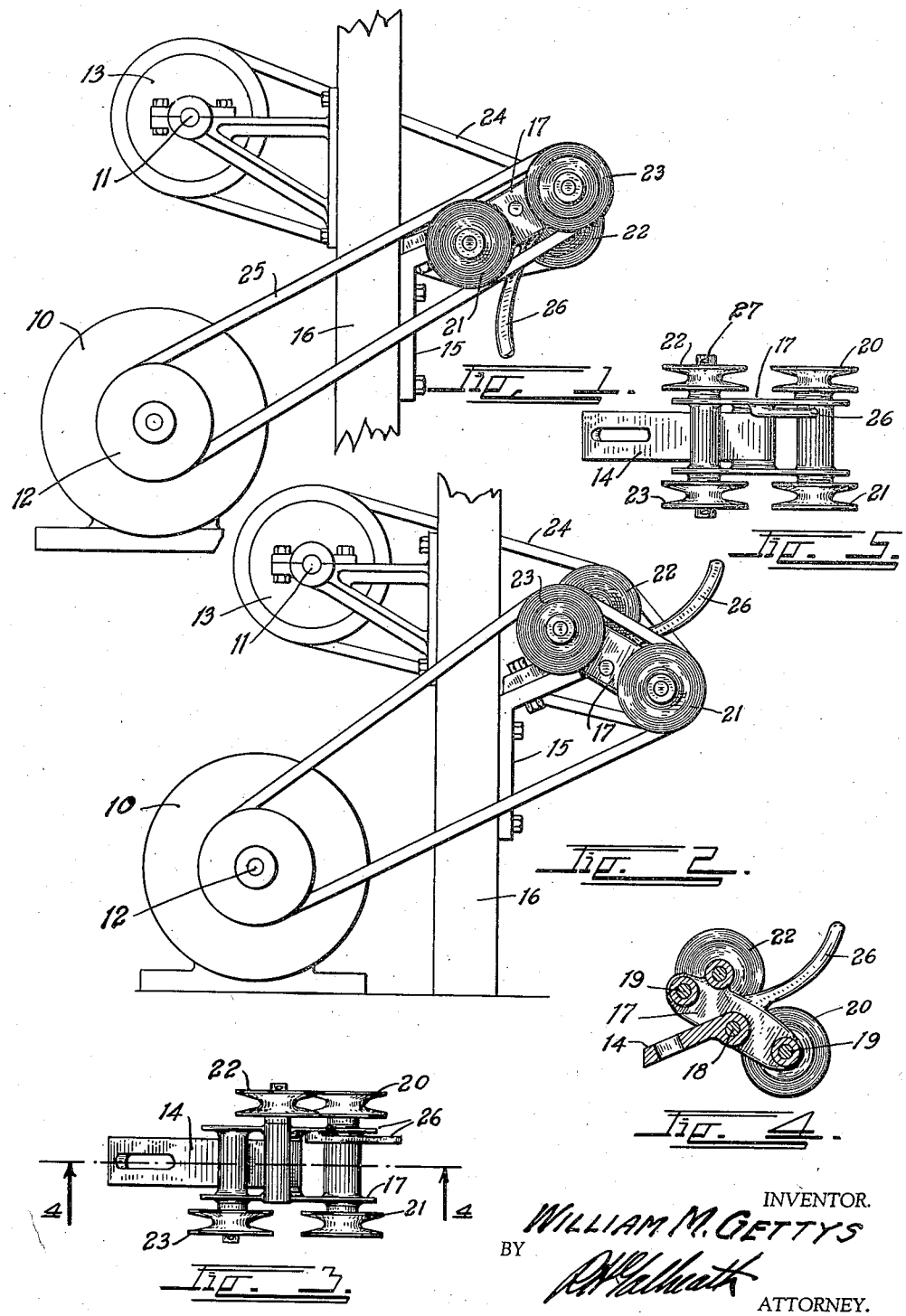
INVENTOR.
WILLIAM M. GETTYS
BY
ATTORNEY.

Patented Mar. 28, 1939

2,152,038

UNITED STATES PATENT OFFICE 2,152,038

BELT DRIVE

William M. Gettys, Greeley, Colo.

Application March 7, 1938, Serial No. 194,414

2 Claims. (Cl. 74—242.10)

This invention relates to what might be termed a V-belt shifting device, and is more particularly designed as an improvement over the constructions shown in applicant's former Patents Nos. 2,024,213 and 2,047,024. The principal object of the invention is to provide a V-belt mechanism for transmitting power from a motor, engine, or line shaft, to a fixed machine, which can be used to stop and start the machine without stopping the motor, without requiring gears, clutches, flexible shafts and other transmission devices. This device serves as a clutch in itself, and employs the V-belt and their pulleys for the clutching operation.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates a typical installation of the invention. In this view the device is shown in the idling position.

Fig. 2 is a similar view showing the device in the working position.

Fig. 3 is a plan view of the invention with the belts removed.

Fig. 4 is a longitudinal section therethrough taken on the line 4—4 of Fig. 3.

Fig. 5 is a plan view of an alternate form of construction.

In the drawing a typical motor or other source of power is indicated at 10, with a line shaft or other device to be driven, indicated at 11. The motor 10 is provided with a drive pulley 12, and the shaft 11 is provided with a driven pulley 13.

The invention comprises a bracket member 14, which can be attached to any suitable supporting member, in fact in some installations it would be attached directly to the driving engine or the motor 10. As illustrated, the member 14 is attached to an arm 15 supported by a standard 16, which in turn supports the line shaft 11.

A rocking member 17, is pivoted on the member 14, by means of a suitable pivot pin 18, so that it may be freely rocked around the extremity of the member 14. A cross shaft 19 is journaled at one extremity of the rocking member, this shaft terminates in two V-belt power pulleys 20 and 21 which are secured to the shaft 19 so as to rotate therewith. On the other extremity of the rocking member are two idler pulleys 22 and 23 positioned in alignment with the pulleys 20 and 21, respectively. The pulleys 20 and 22 receive the driven V-belt 24 and the pulleys 21 and 23 receive the drive V-belt. A suitable handle 26 may be formed on the member 17 for rocking it between its "in" and "out" positions. The motor 10 is operating and the belt 25 is driving the idler pulley 23, so that no power is being transmitted to the power pulley 21, since it is resting idly between the reaches of the belt 25. In this position, the belt 24 is at a standstill since no power is being transmitted to the power pulley 20.

Now let us assume that it is desired to start rotation of the shaft 11. The operator simply lifts upward on the handle 23 turning the rocking member to the position of Fig. 2. As the device approaches, the position of Fig. 2, the power pulley 21 will be gradually brought into contact with the belt 25 and the power pulley 20 will be gradually brought into contact with the belt 24 until the full "on" position of Fig. 2 is reached, at which time the power will be transmitted direct from belt to belt through the shaft 19.

It is desired to call attention to the fact that the arc of swing of the members 17 is such as to maintain a uniform tension in both belts at all times.

In Fig. 3 the idler pulleys are mounted on two separate shafts. They could, however, be mounted on the same shaft, as shown at 27 in Fig. 5 if desired.

It is desired to call attention to the fact that this invention completely eliminates the transmission gears required in the form of Patent 2,047,024 and the flexible shaft of Patent 2,024,213 and yet accomplish the same results with much less frictional power losses.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A V-belt power transmission device for transmitting power from a fixed motor to a fixed shaft, comprising; a rocking member, a power shaft at one extremity of said rocking member; a pair of pulleys fixed on said power shaft; a pair of idler pulleys mounted on the opposite extremity of said rocking member, each of said idler pulleys being in alignment with one of said power pulleys; a drive belt extending from said motor around one of said idler pulleys and one of said power pulleys; and a driven belt extending from said fixed shaft around the other of said idler pulleys and the other of said power pulleys, said rocking member being positioned so that when in one position each belt will engage a power pulley and when in another position, each belt will engage an idler pulley.

2. A V-belt power transmission device for transmitting power from a fixed motor to a fixed shaft, comprising: a supporting member; a rocking member pivoted on said supporting member; a power shaft extending through said rocking member adjacent one extremity thereof; a power pulley fixed on each extremity of said power shaft; an idler pulley mounted on each side of and adjacent the other extremity of said rocking member, each one of said idler pulleys being in alignment with one of said power pulleys; a drive belt extending from said motor around one of said power pulleys so that it will be engaged by one of said idler pulleys when said rocking member is swung; and a driven belt extending from said fixed shaft around the other of said power pulleys in alignment with the other of said idler pulleys.

WILLIAM M. GETTYS.